May 20, 1941.          P. D. BARTON          2,242,639
           METHOD OF TREATING CLAY
         Filed March 29, 1938    2 Sheets-Sheet 1
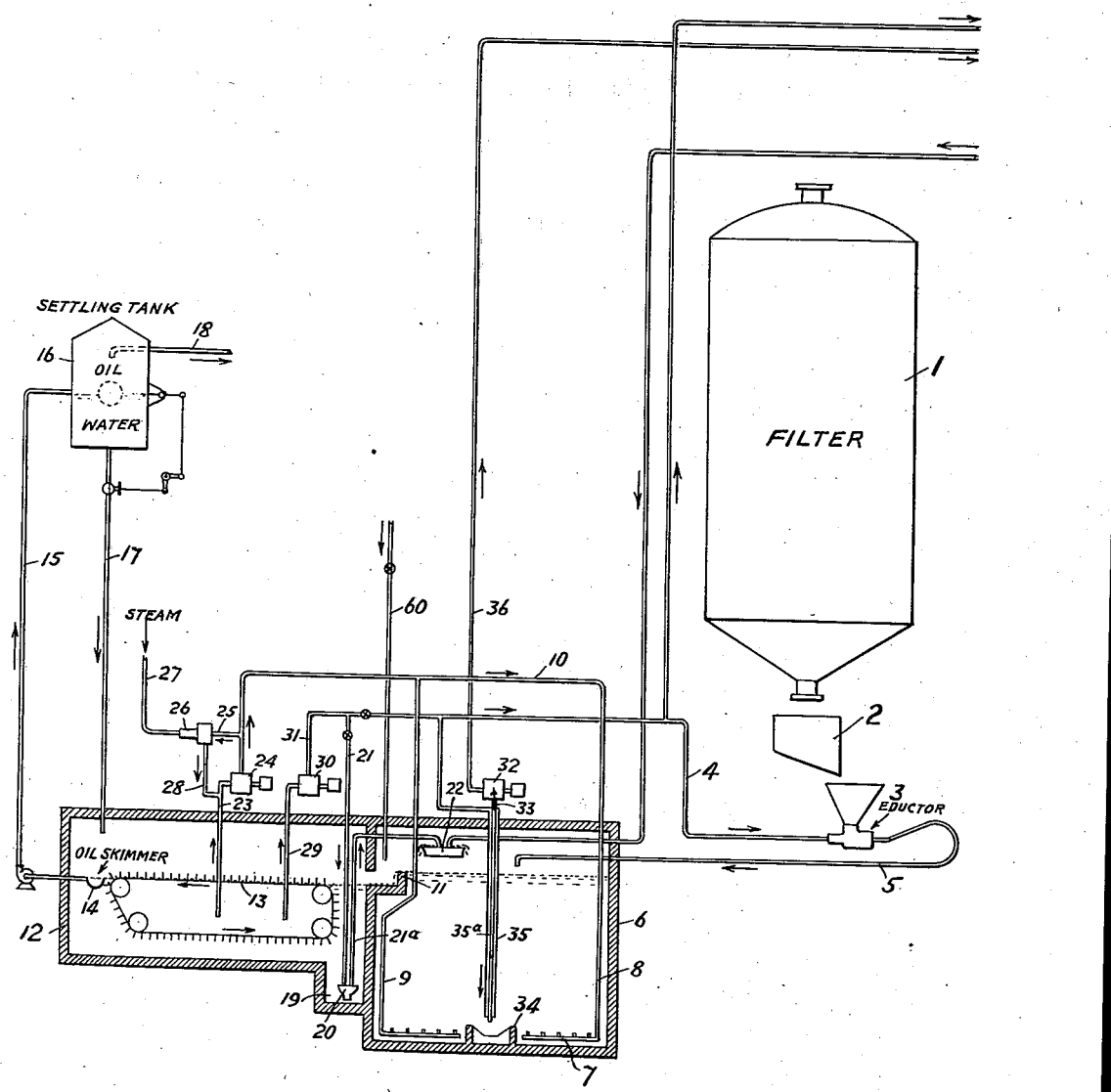
FIG. IA.
WITNESS:
INVENTOR
Paul D. Barton
BY
Busser and Harding
ATTORNEYS.

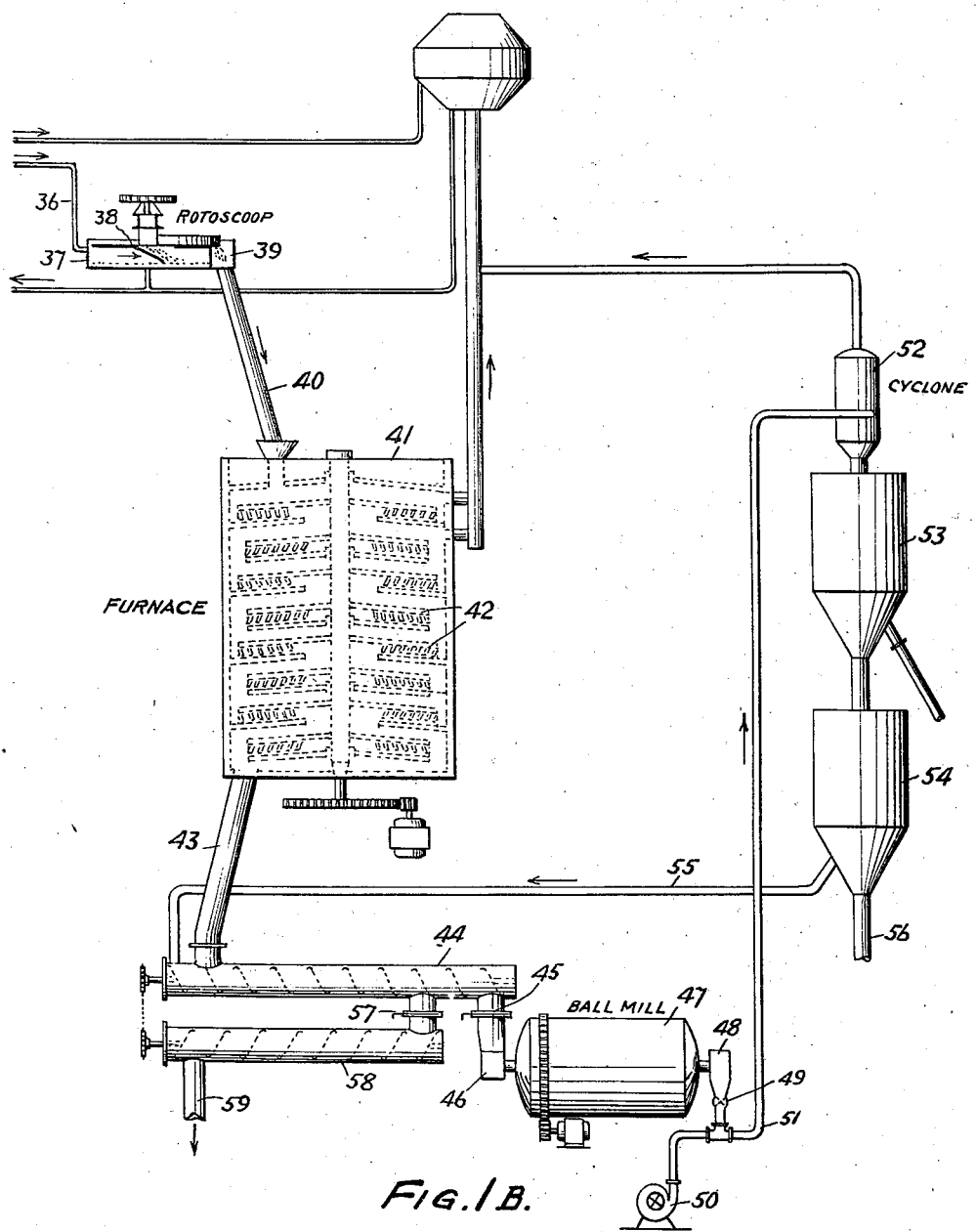
FIG. IB.

Patented May 20, 1941

2,242,639

UNITED STATES PATENT OFFICE 2,242,639

METHOD OF TREATING CLAY

Paul D. Barton, Chester County, Pa., assignor to Sun Oil Company, Philadelphia, Pa., a corporation of New Jersey Application March 29, 1938, Serial No. 198,794

8 Claims. (Cl. 167—42)

The present invention relates to a process and apparatus for recovering filter clay which has been used to purify lubricating oil and more particularly to a process wherein a substantial portion of the oil adsorbed by the clay is recovered, and the clay is prepared either to be re-activated for further use as a filtering or contact agent, or to be converted to a marketable pigment composition for use in paint and like compositions and rubber compositions or as a carrier for powdered insecticides which are used as dusting powders.

In the final purification of lubricating oils, the oil is either filtered through fuller's earth, bentonite, or other porous adsorptive contact material, or it is mixed and agitated with such contact material, in order to de-colorize the oil and, in cases where the oil has been acid treated and has not been subsequently subjected to a caustic wash, to neutralize the oils.

It is therefore an object of the present invention to treat contact materials of the clay type, which have been used either as percolation or contact filtration purifying agents for lubricating oils, to recover therefrom lubricating oil which has been adsorbed by the clay, and to then convert it into marketable products.

Other and further objects of the invention will appear as the description progresses.

Briefly stated, the invention consists in admixing the clay with hot water and passing it to a leaching pit which has been previously filled with hot water. As soon as the pit is filled, hot water is passed up through the clay by admitting it at a multiplicity of places over the floor of the pit so as to cause a steady upflow of water through the clay at all portions of the pit. The hot water passing through the clay bed leaches oil from the clay and this mixture together with some fines overflows into a separator pit having mechanical provisions for skimming the oil from the surface of the separator pit, and for carrying it off in admixture with some water to a final oil settling tank. Some of the fines which pass over with the oil and water to the separator pit settle and are returned to the primary leaching pit by means of an eductor and are evenly distributed over the clay and water in the leaching pit so as not to cause an agitation of the clay which would break up the bed. The excess water from the separator pit is removed, heated, and passed back to the bottom of the clay leaching pit, or is used as a medium for conveying further clay to the leaching pit from the filter. After the desired amount of oil has been removed from the clay by the water in the leaching pit, the clay is passed to a suitable separator for removing the major portion of the water from the clay which is then passed to a furnace where it is burned in either a reducing or an oxidizing atmosphere.

If the clay is to be revivified for re-use, as much oil as possible is removed therefrom during the leaching step, and the clay is subsequently burned in an oxidizing atmosphere to completely remove the oil remaining therein. If, however, the clay is to be used for the manufacture of black pigment, a portion of the oil is left in the clay and the clay is then burned in a reducing atmosphere, causing the oil admixed therewith to be reduced to carbon.

If a carrier of insecticide powders is to be manufactured from the clay, it is washed exactly as if it is to be revivified and is then dried, after which it is thoroughly ground, preferably pulverized, to such an extent that it will pass through a 200 mesh screen, some particles of course being much finer than necessary to pass through cloth of that fineness. It is characteristic of these carrier agents that a certain amount of oil preferably 5% to 10% by weight must be evenly incorporated therein in order to more firmly hold the insecticide powder in admixture therewith and so that particles will adhere to plants, so that when the whole is dusted on orchards, plants etc., an even coverage of the insecticide ingredient is achieved. Heretofore it has been necessary to grind either kaolin clay or clay of another type to the proper degree of fineness and then, by a lengthy and consuming process, spray the powder with oil while constantly mixing it. It is of course apparent that if too much oil is added the fine powder will agglomerate and if too little oil is added the powder will not hold the insecticide as it should. When the clay is treated in the present leaching pits, all of the oil cannot be removed and the amount which is left after treatment by the present process can be so controlled that just the right amount of oil remains therein to accomplish the desired purpose after the clay has been ground to the proper degree of fineness. It is of course to be understood that clay, to which an amount of oil in excess of that desired in the final product has been intentionally added in order to insure in the final product even distribution of the oil throughout the clay, is the equivalent of spent filtering clay containing an amount of oil in excess of that desired in the finished product. The waste water passing from the leaching pits employed in carrying out the present invention still contains some fines which will not settle in the second leaching pit or settling pit. These fines may be recovered either by further settling, filtration, electrical precipitation or other means, and since they contain the proper amount of oil, they may be used after drying as a carrier agent for powdered insecticides.

A furnace of the rotary hearth type, such as a Nichols-Herreshoff, is used to burn the clay. In the first one or two hearths any water left with the clay will be evaporated and will cause further oil to be steam distilled from the clay. The oil so vaporized passes off with the flue gas from the furnace which is passed to a flue gas washer where the oil is condensed and returned to the leaching pit with any fines which may be carried off by the flue gas.

From the furnace the burned clay is passed to a cooler and conveyor and thence if the furnace has been run with an oxidizing atmosphere in order to burn substantially all of the carbon from the clay, the clay is passed to storage for re-use or is disposed of if not fit for further use. If, however, the furnace has been run with a reducing atmosphere so that the oil in the clay is reduced to carbon and the mixture of carbon and clay thus obtained is to be used as a pigment the clay from the cooler is passed to a ball mill wherein it is finely ground. From the ball mill the ground clay with its contained carbon is blown to a cyclone separator wherein the air used to convey the ground clay is separated from the clay. From the cyclone separator the ground clay or pigment is passed to a classifier of the centrifugal type, wherein any unground abrasive material present in the ground clay is removed. From this classifier the clay is passed to a second classifier, usually of the centrifugal type, wherein clay having the proper fineness for use as pigment is separated from that which is too coarse for use as pigment. The coarse material is returned to the ball mill for re-grinding, and the finished pigment is passed to packing equipment.

A better understanding of the invention will be had by reference to the accompanying drawings, which are a diagrammatic representation of one form of apparatus in which the present invention may be carried out.

1 represents a filter which may be either of the percolation or contact type. 2 is a hopper into which the clay may be dumped, for feeding into an eductor 3 to which hot water heated to a temperature of say 120–200° F. is fed through line 4. Within the eductor the water from line 4 mixes with the clay and the mixture in the form of a slurry passes through line 5 to a clay leaching pit 6, the pit 6 having previously been filled with hot water of about the same temperature as that mixed with the clay in the eductor 4. The floor of the pit 6 is covered with a system of perforated pipes 7 which are fed with hot water through lines 8 and 9 from pipe 10. The water admitted from the pipes 7 passes upwardly through the clay in the pit 6 carrying with it oil from the clay and also a small amount of fines present in the clay. This admixture of water, oil and fines overflows the weir 11 and passes into the oil separator pit 12.

The oil separator pit 12 is provided with suitable means such as a continuously revolving belt 13 having raised or ribbed portions or flights thereon, for carrying the oil separating from the water and fines in pit 12 over to an oil skimmer or trough 14, from whence it is passed through line 15 to a final separating tank 16. Water is drawn from the bottom of the separator or settling tank 16 through line 17, and is returned to the system. Oil which is separated in tank 16 is withdrawn through a line 18.

The fines which settle by gravity in the pit 12 are accumulated by the flights on 13 into sump 19 from which they are picked up by means of an eductor 20 to which water from line 21 is fed. The admixture of fines and water is passed through line 21a to the weir box 22 from which it overflows into the clay leaching pit. The separated water from pit 12 is withdrawn through line 23 by means of circulating pump 24 which forces it into line 10. A portion of this water may be by-passed through line 25 to heater 26, wherein it is heated by steam admitted through line 27. This heated water is then returned to the circulating pump through line 28. A further water outlet line 29 is provided in separator pit 12. This water is withdrawn by means of pump 30 and is passed to line 31.

After the clay in the pit 6 has been leached to the degree required, it is removed from the pit by mud pump 32, taking suction on the bottom of the pit, through line 33. Placed within the bottom of the pit 6 is a restricted trough shaped sump 34 into which water is forced through jet pipes 35 and 35a which parallel pipe 33. The water so admitted serves to mix as much water as desired with the clay and water mixture withdrawn by means of mud pump 32. It is evident that if mud pump 32 is operated at a constant speed, the more water which is added through lines 35 and 35a, the less clay will be picked up with the water passing up through line 33 to the mud pump 32. The mixture of leached clay and water passing from the mud pump is forced through line 36 to a separating device 37, wherein substantially all excess water is separated from the clay. This separator 37 may be of the type utilizing radial plows or scrapers 38 which serve to raise the clay from the bottom of the separator, de-water it by the compression caused in plowing it up, and then, by means of a vane, force it out on the peripheral ledge 39, from which it falls down chute 40 to the furnace.

The furnace 41 may be of the Nichols-Herreshoff multiple hearth type having a series of central and annular hearths set one above the other so that the clay is caused by means of rabble arms 42 to pass downwardly from one hearth to the other. Heat is supplied by burners placed between the hearths, and additional air may be admitted from the central shaft which is hollow. By this means the atmosphere in the furnace may be so controlled as to be either a reducing or an oxidizing atmosphere. The bottom hearth of the furnace is air cooled so that the clay is partially cooled before it leaves the furnace.

From the furnace the clay passes through a chute 43 to a screw conveyor and cooler 44. This conveyor and cooler is of the ordinary screw conveyor type, but is furnished with a jacket through which cold air may be blown or through which cooling water may be circulated. At the extreme end of the upper leg of the conveyor there is placed a downwardly extending chute 45 having a slide valve therein. This chute communicates with the hopper 46 at the inlet end of a ball mill 47. The clay enters the ball mill and in the course of grinding moves to the opposite or exit end. The outlet end of the ball mill 47 has a receiving hopper 48, the outlet to which is controlled by a star valve 49. A blower 50 communicating with a pipe 51 furnishes air for conveying the ground material from the ball mill to a cyclone separator 52, within which the ground pigment is separated from the air used to convey it. The separated pigment falls from the cyclone separator 52 into a classifier 53.

Filter clays generally contain a certain amount of silica which is non-porous in nature, and which when burned becomes hard and abrasive. It is practically impossible to grind this material, and it therefore passes substantially unchanged from the ball mill. The classifier 53 serves to separate this abrasive material from the balance of the pigment. The classifier 53 may be of the centrifugal type in which an air stream floats the lighter material depositing it in the outside of the casing, while the heavier material drops through to a second classifier 54 of the same type. Classifier 54 serves to separate that material which is too coarse to be used as pigment, and returns it to the conveyor 44 through line 55. This material which is too coarse for use as pigment is then passed through the conveyor 44 back to the ball mill 47. This material is not so abrasive as that which was removed in the classifier 53, but is merely insufficiently ground clay. From the classifier 54 the finished pigment is withdrawn through pipe 56 to packing equipment.

If the furnace is operated with an oxidizing atmosphere rather than a reducing atmosphere, so that substantially all of the carbon is burned from the clay, the slide valve in line 45 is closed and the fully burned clay is permitted to drop through line 57 by opening the slide valve therein, to the second section 58 of the conveyor, and the fully burned clay is removed through line 59 for storage and re-use in the filters or for disposal.

Strict conditions for the operation of the present process cannot be set forth, due to the differences in filter media and in the oil treated. However, the following will serve as an example:

The clay is mixed with water having a temperature of from 120–200° F. in the eductor 3, and is passed to the leaching pit 6, which has previously been filled with water at about the same temperature. The clay settles to the bottom of the pit and when a sufficient charge has been placed therein, heated water is admitted to the perforated pipes 7. This water is also from 120–200° F. and has a pH value of about 8, since it has been discovered that if the water is neutral or on the acid side it will not properly leach the clay, as the clay is somewhat acid due to the presence of sulphur compounds in the oil. The alkalinity is obtained by the addition of sodium hydroxide or other alkaline material to the water through valved line 60. By regulating the temperature and pH value of the water the amount of oil which will be leached from the clay can be controlled within desired limits, an increase in either or both the temperature or alkalinity of the water serving to increase the amount of oil which will be leached from the clay. As a general rule the temperature chosen for the water will be that temperature at which the oil being filtered is passed through the filter, thus when the clay which is being processed in accordance with the present invention is obtained from a filter which has been handling a light oil, which flows freely at a low temperature, the oil will be at a relatively low temperature and therefore the water used may be at a correspondingly low temperature, while if the clay is obtained from a filter which has been handling a heavy oil, which was heated to a relatively high degree in order to make it flow freely through the filter, the water used for leaching will preferably be heated to a correspondingly high degree. The viscosity of the oil in the clay and also the time that the clay remains in the leaching pit 6 also affect the amount of oil which will be leached from the clay. Thus, due to the number of variables in the process it is impossible to give exact optimum operating conditions; however, the optimum conditions can readily be determined for any particular raw material and product.

The water introduced into the bottom of pit 6 through perforated pipes 7, percolates up through the clay evenly, and without channeling, carrying with it the oil which it removes from the clay during its passage. A certain amount of clay fines are also carried upward by the water and oil and the mixture overflows the weir 11 into the pit 12. Due to the practically quiescent state of the oil and water in pit 12, the oil separates and remains on top and is carried along by the belt 13 to the oil skimmer 14. Since the oil on top is necessarily in a rather thin layer, some water is removed by the oil skimmer 14. From the skimmer 14 the oil and water mixture is passed to a settling tank 16 wherein the oil separates forming a top layer, and the water settles forming a bottom layer. A float placed at the interface of the oil and water layers operates a valve in the water outlet line 17. From time to time oil is drawn off through the line 18. Any clay fines which are carried over into the pit 12 settle into the sump 19 and are removed by the eductor 20 and returned to clay pit 6 where they are evenly distributed by means of a weir box 22 so as not to agitate the clay in the pit 6. The pump 24 serves to withdraw superfluous water from the pit 12 and to pass a portion of it to the heater 26 and to the lines 8 and 9 feeding the perforated pipes 7 on the floor of pit 6. The pump 30 serves to furnish water for the two eductors 20 and 3, as well as to force water down through the pipe 35 in pit 6 to control the amount of clay removed by the mud pump 32. When all the desired or available oil is removed from the clay in the leaching pit 6, the clay is pumped as heretofore explained to the separator 37. The amount of oil removed from the clay varies with the viscosity and other characteristics of the oil adsorbed by the clay, and also with the use to which the clay is to be put after further treatment.

If the clay is to be burned in an oxidizing atmosphere to revivify it, or to place it in condition where it may be disposed of as waste, about 80% of the contained oil may be recovered. If, however, the clay is to be burned in a reducing atmosphere and subsequently ground to form a black pigment, a lesser percentage of oil is recovered so that when burned in a reducing atmosphere in the furnace 42 the clay will contain a considerable amount of carbon.

After the clay has been de-watered, it is passed to the furnace 41 and therein burned as desired. If it is to be later ground and utilized as a pigment, its temperature is controlled so that it does not rise above about 600° F. If, however, the furnace 41 is operated with an oxidizing atmosphere therein, the temperature may go to 1000° F. or higher. If the clay is to be revivified, the temperature is carefully controlled so as not to harm the clay, but if the clay is merely to be disposed of as waste, it may be burned at a higher temperature and thus hasten the burning process, giving the furnace 41 a larger throughput.

When the clay is burned together with an oil in a reducing atmosphere, considerable carbon in a finely divided state is admixed with the clay so that on grinding in the ball mill 47 a finely divided homogeneous black pigment is formed. There will be present in the pigment, however, about 5% of hard abrasive material which is of a greater specific gravity and of larger particle size than the pigment. It must be removed therefore, in order to form a commercial pigment. There is also present about 35% of pigment which is not ground to a fine enough degree. The abrasive material is therefore separated in the first classifier 53 and the insufficiently ground pigment is separated in the second separator 54, so that the remaining 60% of the clay passes out through pipe 56 as extremely fine black pigment capable of passing through a 325 mesh sieve or bolter. This pigment may be utilized for any purposes such as paint compositions, plastic compositions, blacking, etc.

When it is desired to utilize the clay as a powdered carrier for insecticides, the clay is removed from the leaching pit and passed by line 36 to the rotoscoop 39, wherein it is separated from the water used to transmit it through line 36. It is then passed through the furnace, usually at a higher rate of speed than when it is desired to burn the clay, and its temperature is controlled to about 300° F. at the outlet 43. The outlet temperature, however, will depend somewhat upon the type of oil contained in the filter clay. If the oil is extremely light the temperature may have to be lower than the above stated figure in order to prevent distillation of the oil during the vaporization of the contained water, or, on the other hand, if an extremely heavy oil has been filtered by the clay, the temperature may be somewhat higher. After the clay has been dried sufficiently it is conveyed to the ball mill 47 wherein it is pulverized so that substantially all of it will pass through bolting cloth having 200 mesh to the inch. It is usually usable as it passes from the ball mill, but in some cases it may be found expedient to use the centrifugal classifiers 53 and 54 in order to provide material of more uniform characteristics.

If it is desired to use the fines which collect in the sump 19 of the settling pit 12, these fines instead of being returned to the tray 22 and thence back to the leaching pit 6, may be conveyed to a suitable settling apparatus and the fines then settled, either by gravity or by other means, or, if desired, the mixture of fines picked up by the eductor 20 may be passed to filtering or centrifugal separating means for separation. These fines are then dried, preferably in the furnace 41 and may be used as such for carrying agent for insecticides. In some cases it may be advisable to continuously furnish fresh water to the eductor 3 instead of water which is recirculated from the settling pit 12. In this case the waste water passing out through line 29 may contain some fines which can be recovered by settling or other means as disclosed above. These fines, it will be found, will also serve after drying, and usually without grinding, as carrying agent for insecticides.

The present application relates broadly to the herein described method of treating an adsorptive material to remove oil therefrom and to adapt it to further treatment for producing any desired product, such as revivified clay, black pigment or an inert carrier for insecticides. It also relates broadly to the herein disclosed method of treating such adsorptive filtering material to remove oil therefrom but so as to leave therein a predetermined proportion of oil and in subsequently treating such material to produce the desired product. It also relates specifically to the production of an inert carrier for insecticides. I do not specifically claim herein the herein disclosed methods of treating the clay to revivify the same or to produce a black pigment. The use of my herein claimed method of leaching oil from the clay in conjunction with the subsequent burning of the thus treated clay, from which the oil has been removed, in an oxidizing atmosphere to revivify the clay, forms the subject matter of, and is claimed in, my copending application, Serial No. 217,889, filed July 7, 1938, now Patent 2,200,145 which is a division of the present application. The use of my herein claimed method of controlling the amount of oil in clay, in conjunction with the subsequent treatment of clay having a regulated quantity of oil therein, by burning in a reducing atmosphere to produce a black pigment, forms the subject matter of, and is claimed in, my copending application Serial No. 217,888 filed July 7, 1938 which is a division of the present application.

What I claim and desire to protect by Letters Patent is:

1. The method of treating clay containing adsorbed oil to remove oil therefrom and adapt the clay for various uses which comprises mixing said oil bearing clay with water, introducing said mixture of clay and water into a leaching zone and therein passing additional quantities of water through said clay to agitate the same and leach oil therefrom, continuously removing water containing leached out oil and clay fines from said leaching zone and introducing the same into a settling zone and therein permitting said clay fines to settle out and said oil to separate out, removing said settled clay fines from said settling zone and reintroducing them into said leaching zone, skimming oil from said settling zone and introducing it into a separating zone and therein separating said oil from any water remaining therein, removing said clay from said leaching zone, dewatering the thus removed clay and then drying the same to render said clay fit for use.

2. The method set forth in claim 1 in which the water used has a pH value greater than 7.

3. The method of treating clay containing adsorbed oil to remove oil therefrom and adapt the clay for various uses which comprises mixing said oil bearing clay with water; introducing said mixture of clay and water into a leaching zone and therein passing additional quantities of water through said clay to agitate the same and leach oil therefrom until said clay contains a pre-determined quantity of oil, continuously removing water containing leached out oil and clay fines from said leaching zone and introducing the same into a settling zone and therein permitting said clay fines to settle out and said oil to separate out, removing said settled clay fines from said settling zone and reintroducing them into said leaching zone, skimming oil from said settling zone and introducing it into a separating zone and therein separating said oil from any water remaining therein, removing said clay from said leaching zone, dewatering the thus removed clay and then drying the same to render said clay fit for use.

4. The method of treating clay containing adsorbed oil to remove oil therefrom and adapt the clay for various uses which comprises mixing said oil bearing clay with water; introducing said mixture of clay and water into a leaching zone and therein passing additional quantities of water through said clay to agitate the same and leach oil therefrom, continuously removing water containing leached out oil and clay fines from said leaching zone and introducing the same into a settling zone and therein permitting said clay fines to settle out and said oil to separate out, removing said settled clay fines from said settling zone and reintroducing them into said leaching zone, skimming oil from said settling zone and introducing it into a separating zone and therein separating said oil from any water remaining therein, removing water from said settling zone and utilizing the thus removed water as the water used for mixing with said clay and that passed through said clay in said leaching zone, removing said clay from said leaching zone, dewatering the thus removed clay and then drying the same to render said clay fit for use.

5. The method of treating clay containing adsorbed oil to remove oil therefrom and adapt the clay for various uses which comprises mixing said oil bearing clay with water, introducing said mixture of clay and water into a leaching zone and therein passing additional quantities of water through said clay to agitate the same and leach oil therefrom until said clay contains a predetermined quantity of oil, continuously removing water containing leached out oil and clay fines from said leaching zone and introducing the same into a settling zone and therein permitting said clay fines to settle out and said oil to separate out, removing said settled clay fines containing a predetermined quantity of oil from said settling zone, dewatering the thus removed clay fines and drying the same by passing a heated gas thereover at a temperature to dry the same without vaporizing or carbonizing the oil, skimming oil from said settling zone and introducing it into a separating zone and therein separating said oil from any water remaining therein, removing said clay from said leaching zone, dewatering the thus removed clay and then drying the same to render said clay fit for use.

6. A method of making inert carrier for insecticides and the like which comprises mixing an amount of oil greater than that desired in the final product with a clay-like substance, mixing the thus formed mixture of clay and oil with water and introducing the same into a leaching zone therein, passing additional quantities of water through the clay to thereby leach out excess oil from the clay and leave therein a predetermined percentage of oil, continuously removing water containing leached out oil and suspended clay fines from said leaching zone and introducing the same into a settling zone, therein permitting said clay fines to settle out and permitting oil to separate out, removing said clay fines from said settling zone and reintroducing them to said leaching zone, skimming oil from said settling zone and introducing it into a separating zone and therein separating said oil from any water remaining therein, removing said clay containing a pre-determined percentage of oil from said leaching zone, dewatering the thus removed clay and subjecting said dewatered clay to a drying operation at an elevated temperature while controlling the temperature to prevent distillation and carbonization of the oil during vaporization of the contained water.

7. The method of making an inert carrier for insecticides which comprises taking clay which has been used to purify lubricating oils and which contains adsorbed oil in excess of the quantity desired in the final product which comprises mixing said clay with water and introducing the same into a leaching zone, therein passing additional quantities of water through the clay to thereby leach out excess oil from the clay and leave therein a pre-determined percentage of oil, continuously removing water containing leached out oil and suspended clay fines from said leaching zone and introducing the same into a settling zone, therein permitting said clay fines to settle out and permitting oil to separate out, removing said clay fines from said settling zone and reintroducing them to said leaching zone, skimming oil from said settling zone and introducing it into a separating zone and therein separating said oil from any water remaining therein, removing said clay containing a pre-determined percentage of oil from said leaching zone, dewatering the thus removed clay and subjecting said dewatered clay to a drying operation at an elevated temperature while controlling the temperature to prevent distillation and carbonization of the oil during vaporization of the contained water.

8. A method of making inert carrier for insecticides and the like which comprises mixing an amount of oil greater than that desired in the final product with a clay-like substance, mixing the thus formed mixture of clay and oil with water and introducing the same into a leaching zone, therein passing additional quantities of water through the clay to thereby leach out excess oil from the clay and leave therein a predetermined percentage of oil, continuously removing water containing leached out oil and suspended clay fines from said leaching zone and introducing the same into a settling zone, therein permitting said clay fines to settle out and permitting oil to separate out, removing said clay fines from said settling zone and reintroducing them to said leaching zone, skimming oil from said settling zone and introducing it into a separating zone and therein separating said oil from any water remaining therein, continuously removing water from said leaching zone and utilizing said water as a water used for mixing said clay and as the water passed through said clay in said leaching zone, removing said clay containing a pre-determined percentage of oil from said leaching zone, dewatering the thus removed clay and subjecting said dewatered clay to a drying operation at an elevated temperature while controlling the temperature to prevent distillation and carbonization of the oil during vaporization of the contained water.

PAUL D. BARTON.